(12) United States Patent
Geronov (10) Patent No.: US 6,344,293 B1
(45) Date of Patent: Feb. 5, 2002

(54) LITHIUM ELECTROCHEMICAL CELLS WITH ENHANCED CYCLE LIFE

(75) Inventor: Yordan M. Geronov, Tucson, AZ (US)

(73) Assignee: Moltech Corporation, Tucson, AZ (US)

(*) Notice: Subject to any disclaimer, the term of this patent is extended or adjusted under 35 U.S.C. 154(b) by 0 days.

(21) Appl. No.: 09/551,285

(22) Filed: Apr. 18, 2000

(51) Int. Cl.[7] .......... H01M 4/58; H01M 4/60; H01M 6/16
(52) U.S. Cl. .......... 429/218.1; 429/213; 429/231.95; 429/325
(58) Field of Search .......... 429/213, 231.95, 429/325, 218.1

(56) References Cited

U.S. PATENT DOCUMENTS

| | | | |
|---|---|---|---|
| 4,664,991 A | | 5/1987 | Perichaud et al. |
| 4,739,018 A | | 4/1988 | Armand et al. |
| 4,833,048 A | | 5/1989 | Dejonghe et al. |
| 4,917,974 A | | 4/1990 | Dejonghe et al. |
| 4,925,751 A | * | 5/1990 | Shackle et al. .......... 429/191 |
| 4,935,317 A | * | 6/1990 | Fauteux et al. .......... 429/192 |
| 5,011,501 A | * | 4/1991 | Shackle et al. .......... 29/623.1 |
| 5,162,175 A | | 11/1992 | Visco et al. |
| 5,194,341 A | | 3/1993 | Bagley et al. |
| 5,324,599 A | | 6/1994 | Oyama et al. |
| 5,340,368 A | * | 8/1994 | Koksbang et al. .......... 29/623.5 |
| 5,424,151 A | * | 6/1995 | Koksbang et al. .......... 429/213 |
| 5,435,054 A | * | 7/1995 | Tonder et al. .......... 29/623.5 |
| 5,436,091 A | * | 7/1995 | Shackle et al. .......... 429/192 |
| 5,445,856 A | * | 8/1995 | Chaloner-Gill .......... 428/35.9 |
| 5,516,598 A | | 5/1996 | Visco et al. |
| 5,520,903 A | * | 5/1996 | Chang et al. .......... 423/593 |
| 5,529,860 A | | 6/1996 | Skotheim et al. |
| 5,538,812 A | | 7/1996 | Lee et al. |
| 5,549,880 A | * | 8/1996 | Koksbang .......... 423/593 |
| 5,601,947 A | | 2/1997 | Skotheim et al. |
| 5,616,309 A | * | 4/1997 | Zachau-Christiansen et al. 423/592 |
| 5,616,366 A | * | 4/1997 | Olsen et al. .......... 427/508 |
| 5,690,702 A | | 11/1997 | Skotheim et al. |
| 5,723,230 A | | 3/1998 | Naoi et al. |
| 5,783,330 A | | 7/1998 | Naoi et al. |
| 5,792,575 A | | 8/1998 | Naoi et al. |
| 5,882,819 A | | 3/1999 | Naoi et al. |
| 5,935,724 A | | 8/1999 | Spillman et al. |
| 5,935,728 A | | 8/1999 | Spillman et al. |
| 5,962,171 A | | 10/1999 | Boguslavsky et al. |

FOREIGN PATENT DOCUMENTS

| | | |
|---|---|---|
| WO | WO99/33125 | 7/1999 |

OTHER PUBLICATIONS

Blomgren, "Properties, Structure and Conductivity of Organic and Inorganic Electrolytes for Lithium Batteries", *Lithium Batteries*, Chapter 2, pp. 14–15, Academic Press, NY (1983).

(List continued on next page.)

*Primary Examiner*—Tom Dunn
*Assistant Examiner*—Zidia Pittman
(74) *Attorney, Agent, or Firm*—Jacqueline M. Nicol; Steven A. Carlson (57) ABSTRACT

A secondary lithium-sulfur electrochemical cell is provided comprising: (a) an anode comprising lithium; (b) a cathode comprising an electroactive sulfur-containing material; and (c) a non-aqueous electrolyte interposed between the anode and the cathode, wherein the electrolyte comprises: (i) one or more lithium salts; (ii) one or more non-aqueous solvents; and (iii) a cycle life enhancing amount of water; wherein the cycle life enhancing amount of water is greater than 3000 ppm by weight of the electrolyte. Such cells have a long cycle life.

28 Claims, 2 Drawing Sheets

OTHER PUBLICATIONS

Osaka et al., "Enhancement of Lithium Anode Cyclability in Propylene Carbonate Electrolyte by $CO_2$ Addition and its Protective Effect Against $H_2O$ Impurity", *J. Electrochem. Soc.* 1995, 142, 1057–1060.

Aurbach et al., "The Study of Electrolyte Solutions based on Solvents from the "glyme" Family (linear polyethers) for Secondary Li Battery Systems", *Electrochimica Acta*, 1997, 42, 697–718.

Dominey, "Current State of Art on Lithium Battery Electrolytes", Industrial Chemistry, Library, vol. 5, *Lithium Batteries: New Materials, Developments and Perspectives*, Chapter 4, pp. 137–165, Elsevier, Amsterdam, 1994.

Alamgir et al., "Room Temperature Polymer Electrolytes", Industrial Chemistry Library, vol. 5, *Lithium Batteries: New Materials Developments and Perspectives*, Chapter 3, pp. 93–136, Elsevier, Amsterdam, 1994.

U.S. Patent application Ser. No. 08/995,089, to Carlson et al., "Separators for Electrochemical Cells", filed Dec. 19, 1997.

U.S. Patent application Ser. No. 08/955,122, to Gorkovenko et al., "Electroactive, Energy Storing, Highly Crosslinked, Polysulfide–Containing Organic Polymers for Use in Electrochemical Cells", filed Dec. 19, 1997.

U.S. Patent application Ser. No. 09/215,030, to Thibault et al., "Method of Preparing Prismatic Cells", filed Dec. 17, 1998.

* cited by examiner

LITHIUM ELECTROCHEMICAL CELLS WITH ENHANCED CYCLE LIFE

TECHNICAL FIELD

The present invention generally relates to the field of electrochemical cells. More particularly, the invention pertains to lithium rechargeable cells with long cycle life, preferably cells comprising sulfur-containing cathode materials, and to methods of making these cells.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

The need for rechargeable batteries with long cycle life, rapid charge capacity, and high energy density for devices such as mobile telephones, portable computers and other portable electronic devices continues to grow. Rechargeable batteries, such as those based on lithium metal anodes and solid electroactive sulfur-containing cathode active materials, provide one approach to meet this need. For example, U.S. Pat. Nos. 5,529,860; 5,601,947; and 5,690,702; each to Skotheim et al., and U.S. patent application Ser. No. 08/995,112 to Gorkovenko et al. of the common assignee, describe electroactive sulfur-containing cathode active materials and lithium/sulfur batteries comprising sulfur-containing cathode active materials.

However, one problem encountered in electrochemical cells based on lithium and sulfur-containing cathode active materials is limited cycle life, i.e. the number of dischargings and rechargings the battery can accept before the battery is no longer able to maintain acceptable levels of charge capacity, such as 50–80% of the initial capacity of the battery.

Electrolyte additives have been used to improve cycle life. For example, U.S. Pat. No. 5,962,171 to Boguslavsky et al. describes electrolytes containing lithium polysulfides together with 100 to 1000 ppm of water for use in lithium/sulfur electrochemical cells.

With the continued demand in portable electronic devices for rechargeable batteries with greater capacity and improved cycle life, it would be advantageous to be able to utilize a material useful in the non-aqueous electrolyte element of a lithium secondary cell which exhibits beneficial effects on cycle life and safety during the initial charge-discharge cycles of the cell and maintains its beneficial effects during the useful life of the cell, and which can be incorporated easily and reliably into the cell during assembly without significant extra cost.

It is therefore an object of the present invention to provide an additive to the non-aqueous electrolyte which is suitable for use in manufacturing secondary lithium cells and which can be conveniently added to the electrolyte.

Yet another object of the present invention is to provide such an electrolyte additive and non-aqueous electrolyte which is suitable to increase the cycle life of secondary lithium cells.

It is another object of the present invention to provide such a soluble electrolyte additive and non-aqueous electrolyte which is present and useful in the initial discharge-charge cycles of secondary lithium cells.

SUMMARY OF THE INVENTION

The present invention pertains to a secondary electrochemical cell comprising: (a) an anode comprising lithium; (b) a cathode comprising an electroactive sulfur-containing material; and (c) a non-aqueous electrolyte interposed between the anode and the cathode, wherein the electrolyte comprises: (i) one or more lithium salts; (ii) one or more non-aqueous solvents; and (iii) a cycle life enhancing amount of water. Cycle life enhancing amounts of water range from greater than 3,000 ppm by weight of the electrolyte to about 50,000 ppm by weight of the electrolyte. Preferred amounts of water range from 5,000 ppm to about 20,000 ppm by weight of the electrolyte, more preferably from 10,000 ppm to about 20,000 ppm.

Examples of electroactive sulfur-containing cathode materials include elemental sulfur and organic materials comprising both sulfur atoms and carbon atoms, which organic materials may or may not be polymeric and preferably comprise polysulfide moieties. The anode preferably comprises lithium metal. The electrolyte preferably comprises one or more non-aqueous solvents selected from the group consisting of ethers, cyclic ethers, polyethers, esters, sulfones, and sulfolanes, and one or more lithium salts selected from the group consisting of LiBr, LiI, LiSCN, $LiBF_4$, $LiPF_6$, $LiAsF_6$, $LiSO_3CF_3$, $LiN(SO_2CF_3)_2$, $LiC(SO_2CF_3)_3$, $(LiS_x)_zR$, and $Li_2S_x$, where x is an integer from 1 to 20, z is an integer from 1 to 3, and R is an organic group.

In one aspect of the present invention the electrolyte comprises a cycle life enhancing amount of water greater than $10^{-6}$ moles/cm$^2$ of the lithium surface of the cell in contact with the electrolyte.

In another aspect of the present invention a method is provided for increasing the cycle life of a secondary electrochemical cell, wherein the method comprises the steps of (a) providing an anode comprising lithium, preferably comprising lithium metal, (b) providing a cathode comprising an electroactive sulfur-containing material, as described herein, and (c) providing a non-aqueous electrolyte interposed between the anode and the cathode, wherein the electrolyte is prepared by a process comprising preparing a solution of (i) one or more lithium salts, (ii) one or more non-aqueous solvents, and (iii) a cycle life enhancing amount of water greater than 3000 ppm by weight of the electrolyte.

A further object of the present invention is to provide a method of increasing cycle life of a secondary electrochemical cell, as described above, wherein the method comprises a step of incorporating into the cell greater than 3000 ppm of water by weight of the electrolyte in the cell. The method may further comprise a step of releasing gas formed after cell assembly, and prior to sealing the cell. A further step of the method may comprise releasing the gas formed prior to the first discharge-charge cycle of the cell.

DETAILED DESCRIPTION OF THE INVENTION

The present invention pertains to a secondary electrochemical cell and methods for making the cell, wherein the cell comprises: (a) an anode comprising lithium; (b) a cathode comprising an electroactive sulfur-containing material; and (c) a non-aqueous electrolyte interposed between the anode and the cathode; wherein the electrolyte comprises: (i) one or more lithium salts; (ii) one or more non-aqueous solvents; and (iii) a cycle life enhancing amount of water.

The term "cycle," as used herein, relates to a combined charge one-half cycle and a discharge one-half cycle, whereby the cell or battery takes in and stores electrical energy in a charge one-half cycle and releases electrical energy in a discharge one-half cycle.

The term "cycle life," as used herein, relates to the number of cycles undergone by a cell or battery under defined charging and discharging conditions, until the discharge capacity of the cell or battery has fallen to one half of the initial discharge capacity or to some other predetermined discharge capacity.

The term "charge capacity," as used herein, relates to the maximum charge measured in ampere hours (Ah), which a cell or battery is capable of achieving under defined charging conditions. The term "discharge capacity," as used herein, relates to the measured discharge of a cell or battery in ampere hours (Ah) under defined discharge conditions.

The term "Figure of Merit," (FOM), as used herein, is calculated by dividing the accumulated discharge capacity to the end of cycle life in mAh by the capacity of the lithium anode, (theory, 3860 mAh/g of lithium).

In one aspect of the present invention, the electrolyte of the secondary electrochemical cell comprising one or more lithium salts and one or more non-aqueous solvents comprises a cycle life enhancing amount of water greater than 3,000 parts per million (ppm) by weight of the total weight of the electrolyte added to the cell during assembly. In one embodiment of the present invention, the cycle life enhancing amount of water is greater than 5,000 ppm by weight of the electrolyte. In another embodiment of the present invention, the cycle life enhancing amount of water is greater than 10,000 ppm by weight of the electrolyte. In another embodiment of the present invention, the cycle life enhancing amount of water is greater than 15,000 ppm by weight of the electrolyte. In another embodiment of the present invention, the cycle life enhancing amount of water is greater than 20,000 ppm by weight of the electrolyte. In a preferred embodiment of the present invention, the cycle life enhancing amount of water is in the range of greater than 3,000 ppm to about 50,000 ppm by weight of the total weight of the electrolyte. In a more preferred embodiment of the present invention, the cycle life enhancing amount of water is in the range of greater than 5,000 ppm to about 20,000 ppm by weight of the electrolyte. In a still more preferred embodiment of the present invention, the cycle life enhancing amount of water is in the range of greater than 10,000 ppm to about 20,000 ppm by weight of the electrolyte.

In another embodiment of the present invention, the electrolyte of the secondary electrochemical cell comprising one or more lithium salts and one or more non-aqueous solvents comprises a cycle life enhancing amount of water greater than $10^{-6}$ moles/cm$^2$ of the lithium surface in contact with the electrolyte. In a preferred embodiment of the present invention, the electrolyte comprises a cycle life enhancing amount of water from greater than $2 \times 10^{-6}$ moles/cm$^2$ to about $6 \times 10^{-6}$ moles/cm$^2$ of lithium surface in contact with the electrolyte. The lithium surface, as defined herein, is the geometric surface area of the lithium anode comprising lithium that is in contact with the electrolyte in the assembled cell. The lithium surface is calculated based on the surface area of the anode electrode during assembly.

In another aspect of the present invention, the electrolyte of the secondary electrochemical cell comprising one or more lithium salts and one or more non-aqueous solvents comprises a cycle life enhancing amount of water greater than 1,000 parts per million (ppm) by weight of the electrolyte added to the cell during assembly.

The optimum amount of water to enhance cycle life will depend on the specific composition of the electrolyte. For example, on the choice of the one or more non-aqueous solvents, and on their ratio, and on the choice of the specific one or more lithium salts, and on their concentration. The optimum amount of water to enhance cycle life can be determined by experimentation by one of skill in the art.

It is generally accepted that water is deleterious to the performance of lithium batteries so that significant effort is typically placed in drying solvents and other electrolyte components for use in such batteries. For example, Blomgren in *Lithium Batteries*, Chapter 2, pp. 14–15, Academic Press, New York (1983), describes methods and benefits of the removal of impurities, such as water, from electrolytes, and Osaka et al., in *J Electrochem. Soc.*, 1995, 42, 1057–1060, state that water in electrolyte solutions is notorious for reducing lithium anode cyclability. These latter workers report that cycle life for lithium cycling in a LiClO$_4$/propylene carbonate electrolyte is decreased from 60 cycles without water present to 10 cycles with 3000 ppm of water present. Aurbach et al. in *Electrochimica Acta*, 1997, 42, 697–718, report that cycling efficiency is better for several electrolytes with small amounts of water, such as from 100 ppm to 400 ppm. They state, however, that in long term experiments, trace water provides no passivation so that water cannot be considered a desirable additive for lithium battery electrolyte solutions.

The addition of the cycle life enhancing amount of water to the electrochemical cells of the present invention may be done by simply adding the desired amount of water to the electrolyte, i.e., to a solution of the one or more lithium salts in the one or more non-aqueous solvents, prior to adding the electrolyte to the cell during assembly. Alternatively, the desired amount of water may be added to the one or more non-aqueous solvents prior to the dissolution of the one or more lithium salts. Another alternative method which may be used for the addition of the desired amount of water to the electrochemical cell is to add the water to the electrolyte as a solution in a co-solvent, such as a water miscible solvent. It is also contemplated in some aspects of the present invention that the desired amount of water may be added to other components of the electrochemical cell, such as, for example, the separator or the cathode.

After the addition of the electrolyte comprising the cycle life enhancing amount of water, the cell is sealed temporarily and stored for a period of time, such as up to one week. Preferably, after the addition of the electrolyte comprising the cycle life enhancing amount of water, the cell is sealed temporarily and stored for a period of time from 12 hours to 72 hours. Alternatively, after the addition of the electrolyte comprising the cycle life enhancing amount of water, the cell may be stored for a period of time, such as up to one week, without sealing. Gas which may form during storage may then be released and the cell sealed prior to the first discharge-charge cycle. Although a single release of gas may be sufficient, the gas release step may be repeated one or more times, if additional gas is formed, before a permanent sealing and subsequent discharge of the cell. In one embodiment of the present invention, the gas which may form is released from the cell prior to the first discharge-charge cycle of the cell.

Figure 1:
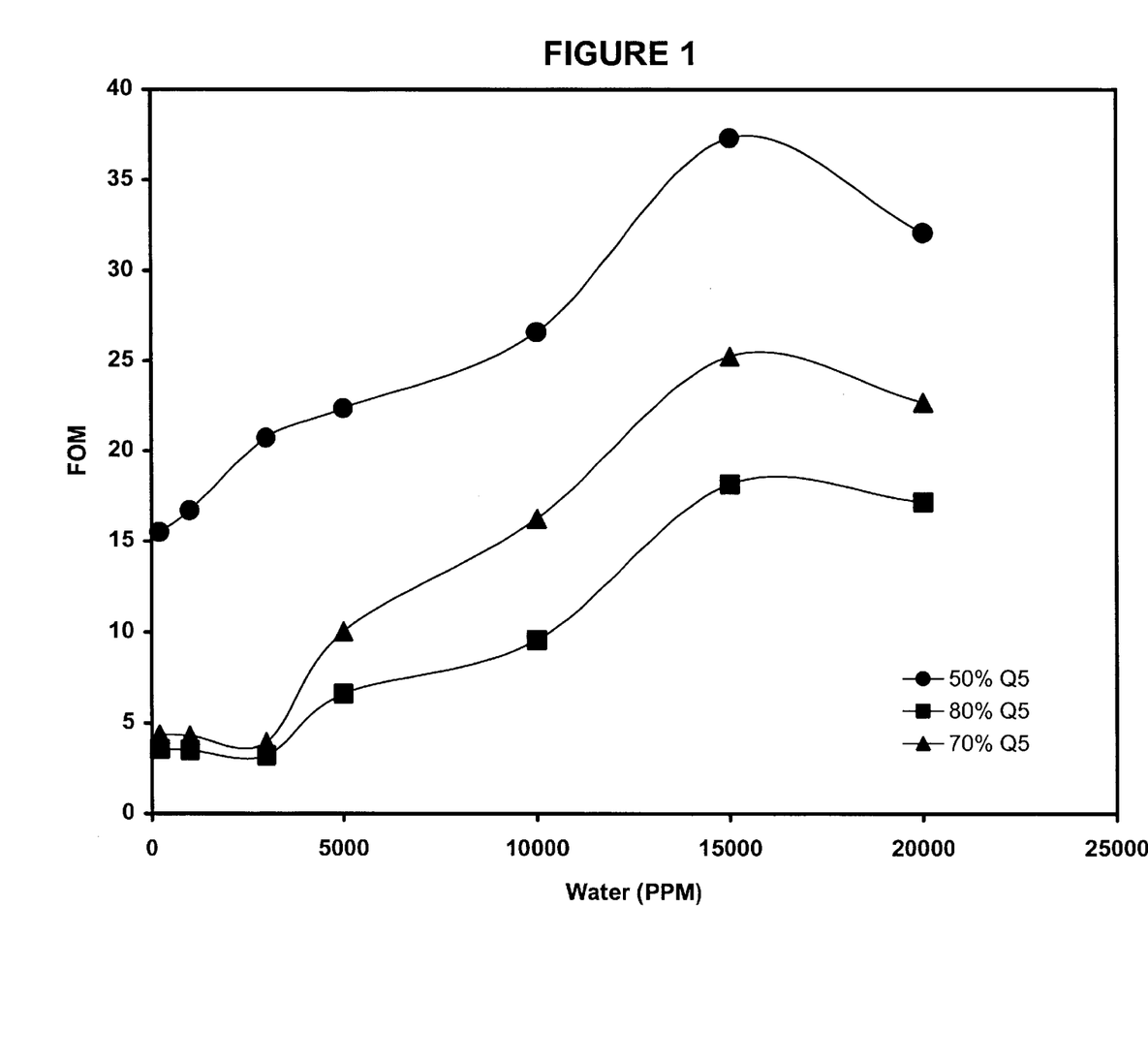
FIG. 1 shows the figure of merit (FOM) vs. water concentration to a capacity of 80% of the capacity at the 5$^{th}$ cycle ($Q_5$) (■), to 70% of $Q_5$ (▼), and to 50% of $Q_5$ (●).
Figure 2:
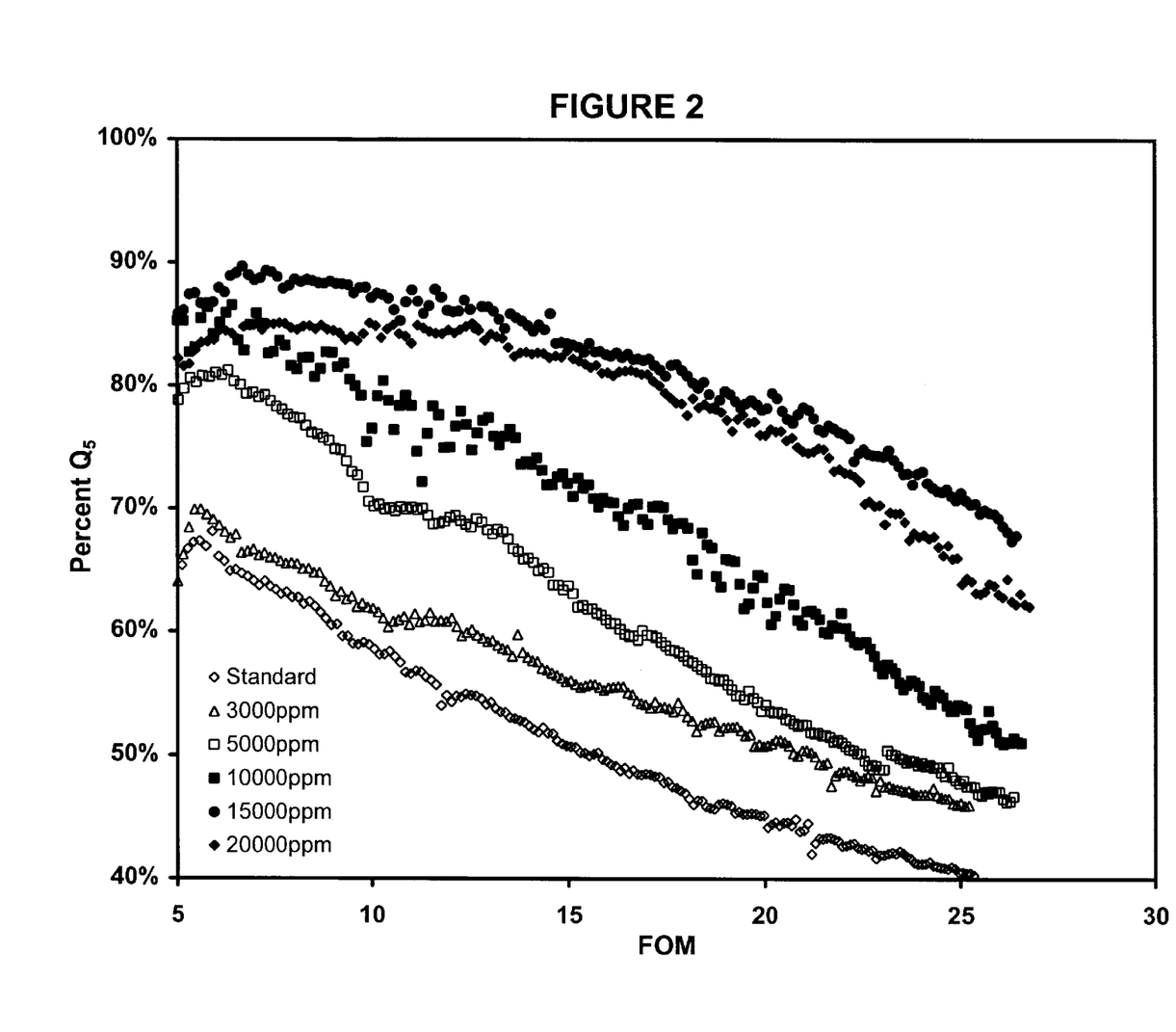
FIG. 2 shows the percent of $Q_5$ vs. FOM at water concentrations of 0 ppm (Comparative Example 1) (◇), 3,000 ppm (Example 1) (△), 5,000 ppm (Example 2) (□), 10,000 ppm (Example 3) (■), 15,000 ppm (Example 4) (●), and 20,000 ppm (Example 5) (◆).

As shown in FIG. 1, FIG. 2, and Table 1, the cycle life and the FOM of lithium secondary electrochemical cells may be significantly enhanced by the presence of large amounts of water in the cell. For example, the cells in which 15,000 ppm by weight of water in the electrolyte is present, Example 4, have a cycle life of 178 cycles until the capacity falls to 70% of the $5^{th}$ cycle capacity ($Q_5$), whereas with 50 ppm of water present, Comparative Example 1, the cycle life to 70% of $Q_5$ is only 22 cycles. The FOM of Example 4 at 70% of $Q_5$ is 25.26 compared with an FOM of 4.38 for Comparative Example 1 at 70% of $Q_5$.

While not wishing to be bound by any theory, it is believed that water improves the solid electrolyte interface on the lithium metal surface in electrochemical cells comprising both lithium anodes and cathodes comprising electroactive sulfur-containing materials. For example, the cycle life enhancing amount of water may form lithium oxides and hydroxides on the lithium surface which allow the passage of lithium ions upon discharging and charging of the cell, and modify or prevent reaction of other cell components at the lithium metal surface. In addition to the water present in the electrolyte, other cell components may also react with the lithium metal surface, including the one or more non-aqueous solvents, the one or more lithium salts, and sulfide ions or polysulfide ions generated upon discharge of the cell. Water and the various cell components, may react independently or cooperatively with lithium metal surface and may thereby form a beneficial solid electrolyte interface. Also, for example, the morphology of the lithium surface of the cells of the present invention is found to be smoother than cells without the cycle life enhancing amount of water.

Electrolytes

The electrolytes used in electrochemical cells function as a medium for the storage and transport of ions, and in the special case of solid electrolytes and gel electrolytes, these materials may additionally function as separator materials between the anode and the cathode. Any liquid, solid, or gel material capable of storing and transporting ions may be used, so long as the material is electrochemically and chemically unreactive with respect to the anode and the cathode, and the material facilitates the transport of lithium ions between the anode and the cathode. The electrolyte must also be electronically non-conductive to prevent short circuiting between the anode and the cathode.

Typically, the electrolyte comprises one or more ionic electrolyte salts to provide ionic conductivity and one or more non-aqueous liquid electrolyte solvents, gel polymer materials, or solid polymer materials. Suitable non-aqueous electrolytes for use in the present invention include, but are not limited to, organic electrolytes comprising one or more materials selected from the group consisting of liquid electrolytes, gel polymer electrolytes, and solid polymer electrolytes, as are known in the art. Examples of non-aqueous electrolytes for lithium batteries are described by Dominey in *Lithium Batteries, New Materials, Developments and Perspectives*, Chapter 4, pp. 137–165, Elsevier, Amsterdam (1994). Examples of gel polymer electrolytes and solid polymer electrolytes are described by Alamgir et al. in *Lithium Batteries, New Materials, Developments and Perspectives*, Chapter 3, pp. 93–136, Elsevier, Amsterdam (1994).

Examples of useful liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

These liquid electrolyte solvents are themselves useful as plasticizers for gel polymer electrolytes. Examples of useful gel polymer electrolyte materials include, but are not limited to, those comprising polymers selected from the group consisting of polyethylene oxides, polypropylene oxides, polyacrylonitriles, polysiloxanes, polyimides, polyphosphazenes, polyethers, sulfonated polyimides, perfluorinated membranes (such as, for example, NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing.

Examples of useful solid polymer electrolyte materials include, but are not limited to, those comprising polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing. These solid polymer electrolyte materials may contain a liquid electrolyte solvent, typically at a level of less than 20% by weight of the total electrolyte.

Ionic electrolyte salts are added to the electrolyte to increase the ionic conductivity. Examples of ionic electrolyte salts for use in the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$, LiNSO$_2$CF$_2$CF$_2$CF$_2$CF$_2$SO$_2$, and the like. Other electrolyte salts useful in the practice of this invention include lithium polysulfides (Li$_2$S$_x$), and lithium salts of organic ionic polysulfides (LiS$_x$R)$_z$, where x is an integer from 1 to 20, z is an integer from 1 to 3, and R is an organic group, and those disclosed in U.S. Pat. No. 5,538,812 to Lee et al. Preferred ionic electrolyte salts are LiBr, LiI, LiSCN, LiBF$_4$, LiPF$_6$, LiAsF$_6$, LiSO$_3$CF$_3$, LiN(SO$_2$CF$_3$)$_2$, LiC(SO$_2$CF$_3$)$_3$, (LiS$_x$)$_z$R, and Li$_2$S$_x$, where x is an integer from 1 to 20, z is an integer from 1 to 3, and R is an organic group.

Cathodes

The term "electroactive sulfur-containing material," as used herein, relates to cathode active materials which comprise the element sulfur in any form, wherein the electrochemical activity involves the breaking or forming of sulfur-sulfur covalent bonds. Examples of suitable electroactive sulfur-containing materials, include, but are not limited to, elemental sulfur and organic materials comprising both sulfur atoms and carbon atoms, which may or may not be polymeric. Suitable organic materials include those further comprising heteroatoms, conductive polymer segments, composites and conductive polymers.

In one preferred embodiment, the electroactive sulfur-containing material comprises elemental sulfur. In one preferred embodiment, the electroactive sulfur-containing material comprises a mixture of elemental sulfur and a sulfur-containing polymer.

In another embodiment, the sulfur-containing material, in its oxidized form, comprises a sulfur-containing polymer comprising a polysulfide moiety, $S_m$, selected from the group consisting of covalent —$S_m$— moieties, ionic —$S_m^-$ moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 6. In one embodiment, m of the polysulfide moiety, $S_m$, of the sulfur-containing polymer is an integer equal to or greater than 8. In one embodiment, the sulfur-containing polymer has a polymer backbone chain and the polysulfide moiety, $S_m$, is covalently bonded by one or both of its terminal sulfur atoms on a side group to the polymer backbone chain. In one embodiment, the sulfur-containing polymer has a polymer backbone chain and the polysulfide moiety, $S_m$, is incorporated into the polymer backbone chain by covalent bonding of the terminal sulfur atoms of the polysulfide moiety.

Preferably, the electroactive sulfur-containing material comprises greater than 50% by weight of sulfur. More preferably, the electroactive sulfur-containing material comprises greater than 75% by weight of sulfur, and, most preferably, the electroactive sulfur-containing material comprises greater than 90% by weight of sulfur.

The nature of the electroactive sulfur-containing materials useful in the practice of this invention may vary widely, as known in the art of electroactive sulfur-containing materials. Further examples of suitable electroactive sulfur-containing materials include, but are not limited to;

(a) an electroactive polycarbon-sulfide material, which in its oxidized state, is of the general formula:

wherein x ranges from greater than 2.5 to about 50, and n is an integer equal to or greater than to 2, as described in U.S. Pat. Nos. 5,601,947 and 5,690,702 to Skotheim et al.; and which, in its oxidized state, comprises one or more of the polysulfur moieties:

wherein m, the same or different at each occurrence, is an integer and is greater than 2, and y, the same or different at each occurrence, is an integer and is equal to or greater than 2.

(b) an electroactive polyacetylene co-polysulfur material, which in its oxidized state, is of the general formula:

wherein x ranges from greater than 1 to about 100, and n is an integer equal to or greater than 2, as described in U.S. Pat. No. 5,529,860 to Skotheim et al.; and which, in its oxidized state, comprises one or more of the moieties:

and wherein m, the same or different at each occurrence, is greater than 2; and, (c) an electroactive, highly crosslinked organic polymer, which polymer comprises polymeric segments of the formula;

wherein:
Q denotes a carbocyclic repeat unit comprising a carbocycle having from 3 to 12 ring carbon atoms;
S denotes a sulfur atom;
m is the number of sulfur atoms in a given polysulfide linkage, is an integer from 3 to 10, and is the same or different at each occurrence;
n denotes the number of crosslinking polysulfide linkages, is an integer from 1 to 20, and is the same or different at each occurrence; and
p is an integer greater than 1; as described in U.S. patent application Ser. No. 08/995,112 to Gorkovenko et al. of the common assignee.

Other suitable electroactive sulfur-containing materials comprising polysulfide linkages include, but are not limited to, those described in U.S. Pat. No. 4,664,991 to Perichaud et al. and in U.S. Pat. Nos. 5,723,230, 5,783,330, 5,792,575 and 5,882,819 to Naoi et al.

Still further examples of electroactive sulfur-containing materials include those comprising disulfide groups as described, for example, in U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

The electroactive sulfur-containing cathodes of the present invention may further comprise electroactive metal chalcogenides, electroactive conductive polymers, and combinations thereof.

The cathodes of the present invention may further comprise one or more conductive fillers to provide enhanced electronic conductivity. Examples of conductive fillers include, but are not limited to, those selected from the group consisting of conductive carbons, graphites, activated carbon fibers, non-activated carbon nanofibers, metal flakes, metal powders, metal fibers, carbon fabrics, metal mesh, and electrically conductive polymers. The amount of conductive filler, if present, is preferably in the range of 2 to 30% by weight.

The cathodes of the present invention may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, those selected from the group consisting of polytetrafluoroethylenes (TeflonO)), polyvinylidene fluorides ($PVF_2$ or PVDF), ethylene-propylene-diene (EPDM) rubbers, polyethylene oxides (PEO), UV curable acrylates, UV curable methacrylates, and heat curable divinyl ethers, and the like. The amount of binder, if present, is preferably in the range of 2 to 30% by weight.

The cathodes of the present invention may further comprise a current collector. These current collectors are useful in efficiently collecting the electrical current generated throughout the cathodes and in providing an efficient surface for attachment of the electrical contacts leading to the external circuit as well as a support for the cathode. Examples of useful current collectors include, but are not limited to, those selected from the group consisting of metallized plastic films, metal foils, metal grids, expanded metal grids, metal mesh, metal wool, woven carbon fabric, woven carbon mesh, non-woven carbon mesh, and carbon felt.

Cathodes of the present invention may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler and/or binder; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode.

Examples of suitable liquid media for the preparation of cathodes of the present invention include aqueous liquids, non-aqueous liquids, and mixtures thereof. Especially preferred liquids are non-aqueous liquids such as, for example, methanol, ethanol, isopropanol, propanol, butanol, tetrahydrofuran, dimethoxyethane, acetone, toluene, xylene, acetonitrile, and cyclohexane.

Mixing of the various components can be accomplished using any of a variety of methods known in the art so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to substrates by any of a variety of well-known coating methods known in the art and then dried using techniques known in the art. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of methods known in the art. Examples of suitable methods for the removal of liquid from the mixture include, but are not limited to, hot air convection, heat, infrared radiation, flowing gases, vacuum, reduced pressure, extraction, and by simply air drying. In the methods of the present invention it may be desirable to have some portion of the cycle life enhancing amount of water be present in the cathode. For example, water present in the cathode may arise from incomplete drying of aqueous based cathode coating formulations or by addition of water after solvent removal.

The method of preparing the cathodes of the present invention may further comprise heating the electroactive sulfur-containing material to a temperature above its melting point and then resolidifying the melted electroactive sulfur-containing material to form a cathode active layer having redistributed sulfur-containing material of higher volumetric density than before the melting process.

Anodes Suitable anode active materials, comprising lithium, for the anodes of the present invention include, but are not limited to, lithium metal, such as lithium foil and lithium deposited onto a substrate, such as a plastic film, and lithium alloys, such as lithium-aluminum alloys and lithium-tin alloys.

Separators

The electrochemical cells of the present invention may further comprise a separator interposed between the cathode and anode. Typically, the separator is a solid non-conductive or insulative material which separates or insulates the anode and the cathode from each other and which permits the transport of ions between the anode and the cathode.

The pores of the separator may be partially or substantially filled with electrolyte. Separators may be supplied as porous free standing films which are interleaved with the anodes and the cathodes in the fabrication of electric current producing cells. Alternatively, the porous separator layer may be applied directly to the surface of one of the electrodes, for example, as described in U.S. patent application Ser. No. 08/995,089 to Carlson et al. of the common assignee and in U.S. Pat. No. 5,194,341 to Bagley el al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous pseudo-boehmite layer, which may be provided either as a free standing film or by a direct coating application on one of the electrodes, as described in PCT Publication No. WO 99/33125, by Carlson et al. of the common assignee. Solid polymer electrolytes and gel polymer electrolytes may also function as a separator in addition to their electrolyte function.

In one embodiment, the solid porous separator is a porous polyolefin separator. In one embodiment, the solid porous separator comprises a microporous xerogel layer, such as, for example, a microporous pseudo-boehmite layer. In an alternative embodiment of the methods of the present invention the cycle life enhancing amount of water may be added to the cell by partially or substantially filling the pores of the separator with water.

Cells and Batteries

Cells or batteries of the present invention may be made in a variety of sizes and configurations which are known to those skilled in the art. These battery design configurations include, but are not limited to, planar, prismatic, jelly roll, w-fold, stacked and the like. Although the methods of the present invention are particularly suitable for use with thin film electrodes, they may nevertheless be beneficial in thick film designs. Alternatively, designs incorporating both low and high surface area regions, as described in U.S. Pat. Nos. 5,935,724 and 5,935,728 to Spillman et al., can be incorporated into jellyroll and other configurations.

Thin film electrodes may be configured into prismatic designs. With the drive to conserve weight thin film barrier materials are particularly preferred, e.g. foils etc. For example, U.S. patent application Ser. No. 09/215,030 to Thibault et al. of the common assignee describes methods for preparing prismatic cells in which suitable barrier materials for sealed casing, methods of filling cells with electrolyte, and methods of sealing the casing, are described. With thin film electrodes when configured into prismatic designs it is important that the electrodes possess dimensional stability. For example, it is important that there is minimal swelling in the cells as the number of cycles increases. It has been found that the methods of the present invention lead to minimal changes in cell thickness during cycling of cells, as shown in Table 3. This behavior is particularly beneficial when long cycle life is also achieved. The swelling in the cells is typically a result of dimensional changes in the electrodes and not a result of the formation of gases from traces of water in the cell components reacting with metallic lithium or from the formation of gaseous species, such as low boiling hydrocarbons, from reactions of lithium with electrolyte solvents.

EXAMPLES

Several embodiments of the present invention are described in the following examples, which are offered by way of illustration and not by way of limitation.

Comparative Example 1

A cathode was prepared by coating a mixture of 75 parts of elemental sulfur (available from Aldrich Chemical Company, Milwaukee, Wis.), 15 parts of a conductive carbon pigment PRINTEX XE-2 (a trademark for a carbon pigment available from Degussa Corporation, Akron, Ohio), and 10 parts of PYROGRAF-III (a tradename for carbon filaments available from Applied Sciences, Inc., Cedarville, Ohio) dispersed in isopropanol onto a 12 micron thick conductive carbon coated aluminum/polyester (PET) film substrate. After drying, the coated cathode active layer thickness was about 30 microns. The anode was lithium foil of about 50 microns in thickness. The electrolyte was a 1.4 M solution of lithium bis (trifluoromethylsulfonyl) imide, (lithium imide available from 3M Corporation, St. Paul, Minn.) in a 42:58 volume ratio mixture of 1,3-dioxolane and dimethoxyethane, with water content of 50 ppm. The porous separator used was 16 micron E25 SETELA (a trademark for a polyolefin separator available from Tonen Chemical Corporation, Tokyo, Japan, and also available from Mobil Chemical Company, Films Division, Pittsford, N.Y.).

The above components were combined into a layered structure of cathode/separator/anode, which was wound and compressed, with the liquid electrolyte (approximately 4 g) filling the void areas of the separator and cathode to form prismatic cells with an electrode area of about 840 cm$^2$. After sealing the cells in a foil pouch, they were stored for 48 hours and then the gas which had formed in the cells was vented. The cells were re-sealed and discharge-charge cycling on these cells was performed for five cycles at 350 mA/200 mA, respectively, with discharge cutoff at a voltage of 1.5V and charge cutoff at 110% of the capacity of the last half cycle. For the next five cycles the cells were discharged at GSM conditions with 2000 mA×0.6 mS and 150 mA×4.4 mS pulses. After ten cycles, the discharge-charge cycling of the cells was continued under the same conditions as the first five cycles.

In an alternative implementation of the method of this Comparative Example 1, water was added to the electrolyte to give a concentration of 1,000 ppm by weight of the electrolyte. Discharge-charge cycling on these cells by the cycling process of this Comparative Example 1 gave FOM at 70% of $Q_5$ of 4.32 (number of cycles 22) and FOM at 50% of $Q_5$ of 16.71 (number of cycles 116).

Example 1

A cell was prepared by the method of Comparative Example 1 except that water was added to the electrolyte to give a concentration of 3000 ppm by weight of the electrolyte. Discharge-charge cycling on these cells was performed by the cycling process of Comparative Example 1.

For this cell the moles of water per unit area of the geometric area of lithium surface can be calculated as follows. Each cell is charged with 4 g of electrolyte so that the weight of water charged is 3,000/1,000,000×4 g=1.2× 10$^{-2}$ g.

This is 1.2/18×10$^{-2}$ moles of water, or 0.67×10$^{-3}$ moles. The geometric surface area of lithium in each cell is 840 cm$^2$ so that the amount of water per unit of surface area of lithium is: 0.67/840×10$^{-3}$ moles/cm$^2$ or approximately 0.8×10$^{-6}$ moles/cm$^2$.

Example 2

A cell was prepared by the method of Comparative Example 1 except that water was added to the electrolyte to give a concentration of 5000 ppm by weight of the electrolyte. Discharge-charge cycling on these cells was performed by the cycling process of Comparative Example 1.

Example 3

A cell was prepared by the method of Comparative Example 1 except that water was added to the electrolyte to give a concentration of 10,000 ppm by weight of the electrolyte. Discharge-charge cycling on these cells was performed by the cycling process of Comparative Example 1.

Example 4

A cell was prepared by the method of Comparative Example 1 except that water was added to the electrolyte to give a concentration of 15,000 ppm by weight of the electrolyte. Discharge-charge cycling on these cells was performed by the cycling process of Comparative Example 1.

Example 5

A cell was prepared by the method of Comparative Example 1 except that water was added to the electrolyte to give a concentration of 20,000 ppm by weight of the electrolyte. Discharge-charge cycling on these cells was performed by the cycling process of Comparative Example 1.

In Table 1 are summarized the cell performance data of Comparative Example 1 and Examples 1–5 from the discharge-charge cycling.

TABLE 1

Cell Performance vs. Water Concentration

| Example | Water (ppm) | Capacity at 5$^{th}$ Cycle (Q$_5$) | FOM at 70% of Q$_5$ | Number of cycles to 70% of Q$_5$ | FOM at 50 % of Q$_5$ | Number of cycles to 50% of Q$_5$ |
|---|---|---|---|---|---|---|
| Comparative Example 1 | 50 | 982 mAh | 4.38 | 22 | 15.51 | 105 |
| Example 1 | 3,000 | 929 mAh | 3.96 | 21 | 20.73 | 152 |
| Example 2 | 5,000 | 839 mAh | 10.04 | 62 | 22.37 | 166 |
| Example 3 | 10,000 | 780 mAh | 16.27 | 110 | 26.60 | 204 |
| Example 4 | 15,000 | 727 mAh | 25.26 | 178 | 34.2 | 270 |
| Example 5 | 20,000 | 776 mAh | 22.70 | 152 | 34.5 | 275 |

Comparative Example 2

A cathode was prepared by coating a mixture of 65 parts of elemental sulfur, 15 parts of a conductive c arb on pigm ent PRINTEX XE-2, 15 parts of PYROGRAF-300, and 5 parts of CAB-O-SIL TS-530(a trademark for a fumed silica available from Cabot Corporation, Tuscola, Ill.) dispersed in isopropanol onto a 12 micron thick conductive carbon coated aluminum/PET substrate. After drying, the coated cathode active layer thickness was about 30 microns. The anode, separator, and electrolyte with water content of 50 ppm, as described in Comparative Example 1, and the cathode of Comparative Example 2 were combined into a cell by the method as also described in Comparative Example 1. After sealing, the cells in a foil pouch, they were stored for 48 hours and then the gas which had formed in the cells was vented. The cells were re-sealed and discharge-charge cycling on these cells was performed by the cycling process of Comparative Example 1.

Example 6

A cell was prepared by the method of Comparative Example 2 except that water was added to the electrolyte to give a concentration of 3000 ppm by weight of the electrolyte. Discharge-charge cycling on these cells was performed by the cycling process of Comparative Example 1.

Example 7

A cell was prepared by the method of Comparative Example 2 except that water was added to the electrolyte to give a concentration of 5000 ppm by weight of the electrolyte. Discharge-charge cycling on these cells was performed by the cycling process of Comparative Example 1.

In Table 2 are summarized the cell performance data of Comparative Example 2 and Examples 6–7 from the discharge-charge cycling.

TABLE 2

Cell Performance vs. Water Concentration

| Example | Water (ppm) | Capacity at 5$^{th}$ Cycle (Q$_5$) | FOM at 50 % of Q$_5$ | Number of cycles to 50% of Q$_5$ |
|---|---|---|---|---|
| Comparative Example 2 | 50 | 808 mAh | 18.5 | 105 |
| Example 6 | 3,000 | 780 mAh | 20.3 | 120 |
| Example 7 | 5,000 | 749 mAh | 26.1 | 160 |

As shown in Table 3 thickness measurements were made on cells of Comparative Example 1 and Examples 1–5 after one cycle and after at least 140 cycles. The examples of the present invention show a reduction in thickness whereas Comparative Example 1 shows an increase in thickness.

TABLE 3

Cell Thickness vs. Water Concentration

| Example | Water (ppm) | Cell Thickness after 1 cycle (mm) | Cell Thickness (mm) |
|---|---|---|---|
| Comparative Example 1 | 50 | 7.39 | 7.91 at 154 cycles |
| Example 1 | 3,000 | 8.13 | 7.80 at 150 cycles |
| Example 2 | 5,000 | 8.11 | 7.69 at 160 cycles |
| Example 3 | 10,000 | 8.15 | 7.61 at 154 cycles |
| Example 4 | 15,000 | 7.56 | 7.27 at 146 cycles |
| Example 5 | 20,000 | 7.67 | 7.21 at 140 cycles |

In Table 4 are presented results of measurements of impedance of cells of Comparative Example 1 and Examples 1–5 after one cycle and after at least 140 cycles. Impedance measurements were made at 1000 Hz using an HP model 4338A Milliohmeter.

TABLE 4

Cell Impedance vs. Water Concentration

| Example | Water (ppm) | Impedance after 1 cycle (ohm) | Impedance (ohm) |
|---|---|---|---|
| Comparative Example 1 | 50 | 0.049 | 0.061 at 154 cycles |
| Example 1 | 3,000 | 0.049 | 0.056 at 150 cycles |
| Example 2 | 5,000 | 0.048 | 0.074 at 160 cycles |
| Example 3 | 10,000 | 0.047 | 0.059 at 154 cycles |
| Example 4 | 15,000 | 0.053 | 0.047 at 146 cycles |
| Example 5 | 20,000 | 0.046 | 0.050 at 140 cycles |

While the invention has been described in detail and with reference to specific embodiments thereof, it will be apparent to one skilled in the art that various changes and

What is claimed is:

1. A secondary electrochemical cell comprising:
    (a) an anode comprising lithium;
    (b) a cathode comprising an electroactive sulfur-containing material; and
    (c) a non-aqueous electrolyte interposed between said anode and said cathode, wherein said electrolyte comprises:
       (i) one or more lithium salts;
       (ii) one or more non-aqueous solvents; and
       (iii) a cycle life enhancing amount of water;
    wherein said cycle life enhancing amount of water is greater than 3000 ppm by weight of said electrolyte.

2. The cell of claim 1, wherein said cycle life enhancing amount of water is greater than 5000 ppm by weight of said electrolyte.

3. The cell of claim 1, wherein said cycle life enhancing amount of water is greater than 10,000 ppm by weight of said electrolyte.

4. The cell of claim 1, wherein said cycle life enhancing amount of water is greater than 15,000 ppm by weight of said electrolyte.

5. The cell of claim 1, wherein said cycle life enhancing amount of water is greater than 20,000 ppm by weight of said electrolyte.

6. The cell of claim 1, wherein said electroactive sulfur-containing material comprises elemental sulfur.

7. The cell of claim 1, wherein said electroactive sulfur-containing material, in its oxidized state, comprises one or more polysulfide moieties, $-S_m-$, where m is an integer equal to or greater than 3.

8. The cell of claim 1, wherein said electroactive sulfur-containing material, in its oxidized state, comprises one or more polysulfide moieties, $-S_m^-$, where m is an integer equal to or greater than 3.

9. The cell of claim 1, wherein said electroactive sulfur-containing material, in its oxidized state, comprises one or more polysulfide moieties, $S_m^{2-}$, where m is an integer equal to or greater than 3.

10. The cell of claim 1, wherein said electroactive sulfur-containing material, in its oxidized state, is of the general formula wherein x ranges from greater than 2.5 to about 50, and n is an integer equal to or greater than to 2.

11. The cell of claim 1, wherein said electroactive sulfur-containing material, in its oxidized state, comprises one or more of the polysulfur moieties:

wherein m, the same or different at each occurrence, is an integer and is greater than 2, and y, the same or different at each occurrence, is an integer and is equal to or greater than 1.

12. The cell of claim 1, wherein said electroactive sulfur-containing material, in its oxidized state, comprises one or more of the moieties:

wherein m is the same or different at each occurrence and is greater than 2.

13. The cell of claim 1, wherein said electroactive sulfur-containing material comprises greater than 50% by weight of sulfur.

14. The cell of claim 1, wherein said electroactive sulfur-containing material comprises greater than 75% by weight of sulfur.

15. The cell of claim 1, wherein said electroactive sulfur-containing material comprises greater than 90% by weight of sulfur.

16. The cell of claim 1, wherein said anode comprises lithium metal.

17. The cell of claim 1, wherein said one or more lithium salts are selected from the group consisting of LiBr, LiI, LiSCN, $LiBF_4$, $LiPF_6$, $LiAsF_6$, $LiSO_3CF_3$, $LiN(SO_2CF_3)_2$, $LiC(SO_2CF_3)_3$, $(LiS_x)_zR$, and $Li_2S_x$, where x is an integer from 1 to 20, z is an integer from 1 to 3, and R is an organic group.

18. The cell of claim 1, wherein said one or more non-aqueous solvents are selected from the group consisting of ethers, cyclic ethers, polyethers, esters, sulfones, and sulfolanes.

19. A secondary electrochemical cell comprising:
    (a) an anode comprising lithium;
    (b) a cathode comprising an electroactive sulfur-containing material; and
    (c) a non-aqueous electrolyte interposed between said anode and said cathode wherein said electrolyte comprises:
       (i) one or more lithium salts;
       (ii) one or more non-aqueous solvents; and
       (iii) a cycle life enhancing amount of water;
    wherein said cycle life enhancing amount of water is greater than 3000 ppm to 50,000 ppm by weight of said electrolyte.

20. A secondary electrochemical cell comprising:
    (a) an anode comprising lithium;
    (b) a cathode comprising an electroactive sulfur-containing material; and
    (c) a non-aqueous electrolyte interposed between said anode and said cathode wherein said electrolyte comprises:
       (i) one or more lithium salts;
       (ii) one or more non-aqueous solvents; and
       (iii) a cycle life enhancing amount of water;

wherein said cycle life enhancing amount of water is greater than 1000 ppm by weight of said electrolyte.

21. A secondary electrochemical cell comprising:
(a) an anode comprising a lithium surface;
(b) a cathode comprising an electroactive sulfur-containing material; and
(c) a non-aqueous electrolyte interposed between said anode and said cathode wherein said electrolyte comprises:
(i) one or more lithium salts;
(ii) one or more non-aqueous solvents; and
(iii) a cycle life enhancing amount of water;
wherein said cycle life enhancing amount of water is greater than $10^{-6}$ moles/cm$^2$ of said lithium surface in contact with said electrolyte.

22. A method of making a secondary electrochemical cell comprising the steps of:
(a) providing an anode comprising lithium;
(b) providing a cathode comprising an electroactive sulfur-containing material; and
(c) providing a non-aqueous electrolyte interposed between said anode and said cathode, wherein said electrolyte is prepared by a process comprising preparing a solution of: (i) one or more lithium salts; (ii) one or more non-aqueous solvents; and (iii) a cycle life enhancing amount of water greater than 3000 ppm by weight of said electrolyte.

23. A method of increasing the cycle life of a secondary electrochemical cell, wherein said cell comprises:
(a) an anode comprising lithium;
(b) a cathode comprising an electroactive sulfur-containing material; and
(c) a non-aqueous electrolyte interposed between said anode and said cathode, wherein said electrolyte comprises:
(i) one or more lithium salts; and
(ii) one or more non-aqueous solvents; and
wherein said method comprises a step of incorporating in said electrolyte greater than 3000 ppm of water by weight of said electrolyte.

24. The method of claim 23, wherein said method further comprises a step of temporarily sealing the cell.

25. The method of claim 23, wherein said method further comprises a step of storing said cell prior to the first discharge-charge cycle of said cell.

26. The method of claim 23, wherein said method further comprises a step of releasing gas formed after assembly of said cell and prior to permanently sealing said cell.

27. The method of claim 26, wherein said step of releasing said gas formed is carried out prior to the first discharge-charge cycle of said cell.

28. A method of increasing the cycle life of a secondary electrochemical cell, wherein said cell comprises:
(a) an anode comprising a lithium surface;
(b) a cathode comprising an electroactive sulfur-containing material; and
(c) a non-aqueous electrolyte interposed between said anode and said cathode, wherein said electrolyte comprises:
(i) one or more lithium salts; and
(ii) one or more non-aqueous solvents;
wherein said method comprises a step of incorporating into said electrolyte greater than $10^{-6}$ moles of water/cm$^2$ of said lithium surface in contact with said electrolyte.

* * * * *